No. 723,006. PATENTED MAR. 17, 1903.
H. B. MORRIS.
CHAIR.
APPLICATION FILED DEC. 24, 1902.
NO MODEL.
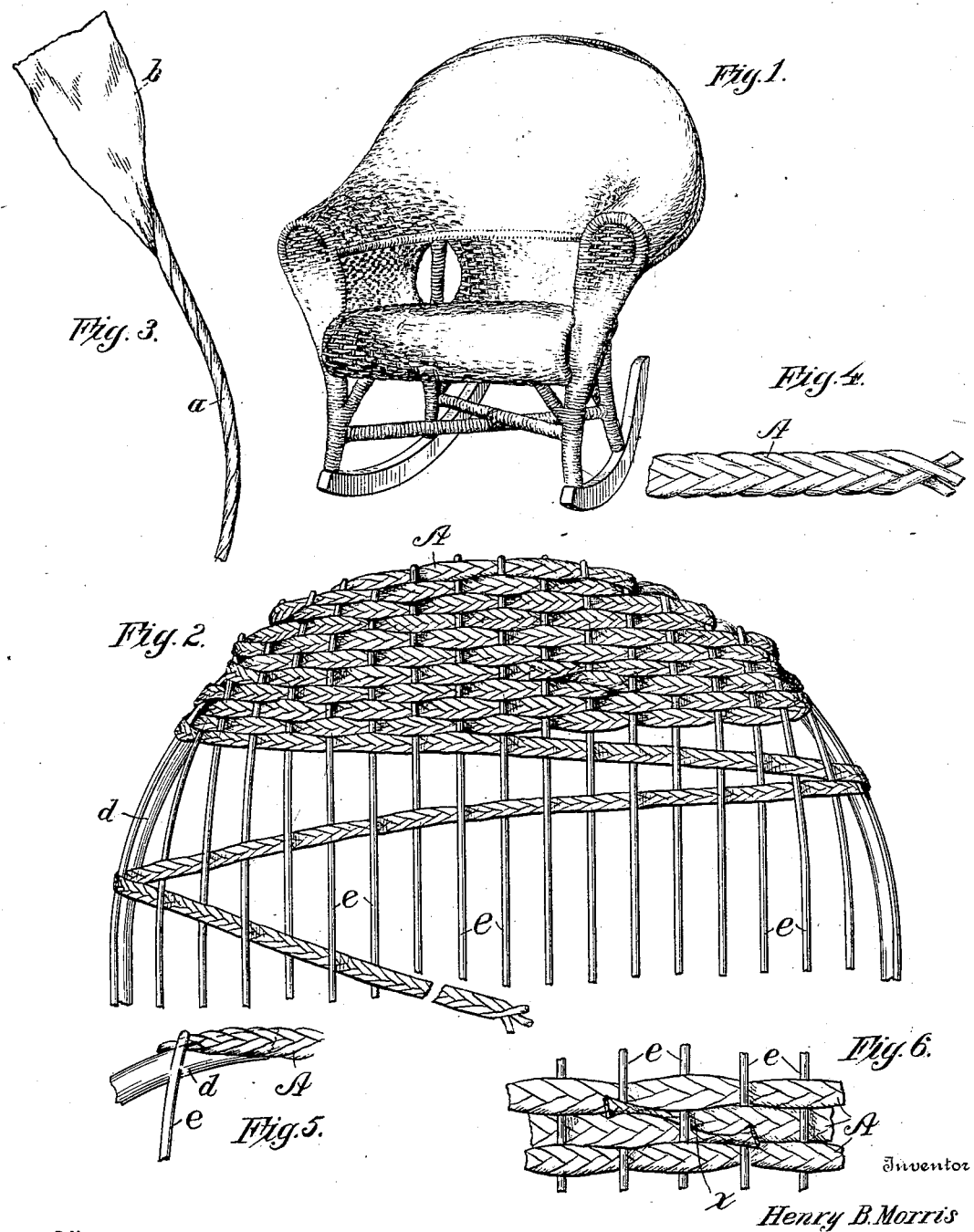
Witnesses
Inventor
Henry B. Morris
By Baldwin Davidson & Wight
his Attorneys

UNITED STATES PATENT OFFICE.

HENRY B. MORRIS, OF MICHIGAN CITY, INDIANA.

CHAIR.

SPECIFICATION forming part of Letters Patent No. 723,006, dated March 17, 1903.

Application filed December 24, 1902. Serial No. 136,492. (No model.)

*To all whom it may concern:*

Be it known that I, HENRY B. MORRIS, a citizen of the United States, residing at Michigan City, in the county of Laporte and State of Indiana, have invented certain new and useful Improvements in Chairs and Fabrics for Making the Same and other Articles, of which the following is a specification.

Flag or rush chairs made by covering skeleton chair-frames with braided flag or rush leaves have been on the market for many years. Other articles of furniture have been made in the same way, and these articles have been coated with varnish to give them an attractive appearance. Recently similar articles have been made of prairie-grass; but the braids made from rush or flag have necessarily been quite short, while those made from grass while of indefinite length are made from blades of grass which are themselves quite short, bunches of the blades being bound by a thread wound spirally around them to form long cords or ropes, which are braided. Defects have always been recognized in articles made from either flag or grass or, in fact, from any natural vegetable fiber. The leaves of flag being quite short, the braids made from them can be made to cover only a small portion of the frame, thus requiring very nice work to tuck in the ends, so that they will not present an unseemly appearance; but ends of from one-fourth to one-half an inch have always been allowed to project, because otherwise the braid would slip, and thus expose longer ends, which would tend to unbraid. These flag braids have always been made by hand and vary not only in length, but also in width, necessarily forming an irregular fabric with undesirable openings at various points. Each flag-leaf consists of a central pithy portion and a comparatively hard smooth covering. The pith is yielding and elastic for a time, but becomes set or deformed, and as the coating is smooth and slippery the braid slips on the frame which it is used to cover, and thus crowds together in some places, while unsightly gaps are formed in other places. This is true of all coverings made from natural vegetable fiber. Flag and other vegetable fibers are apt to rot if exposed to dampness, and while curing they always change color. It has been a common practice to apply a coating of varnish to articles covered with braided flag or similar vegetable fiber, but this coating has been merely superficial, the silicious coating of the leaves preventing the varnish from entering or being absorbed by the fibers, and no care has been taken to cement the strands of the braid to each other or to join adjacent braids to themselves and to the frame by an adhesive. Another defect in articles made from flag or similar vegetable fiber which I have observed is that when curing or drying the silicious coating is apt to crack, especially when varnished, and small pieces scale off or can readily be picked off, thus exposing the natural color of the fiber in spots and giving the article a checkered look that mars its appearance.

Fabrics made from prairie-grass are not open to all the objections incident to the use of flag and similar fibers, because, as before stated, the braids may be made of indefinite length; but the grass has a pithy inner portion and a smooth slippery coating similar to that of flag and is open to the same objections. Furthermore, the cords or ropes for the braid cannot be made of prairie-grass without the use of binding-thread, which is unsightly, produces an objectionable wearing-surface, and if the thread is cut, broken, or worn out the fibers separate, and the integrity of the fabric is destroyed. It will therefore be plain that articles made by covering frames with fabrics made of flag or similar vegetable fiber necessarily soon deteriorate in appearance and in strength. Recognizing these defects, I have sought to overcome them, while producing a fabric which shall have the same general appearance, because fabrics made from the natural flag have always been recognized as most beautiful.

I have considered that it is important to first provide a cord from which to make braid which while resembling the flag shall be of indefinite length and of uniform diameter or width at all points. These conditions are fulfilled by providing a cord made from paper which may be colored to resemble the natural color of flag and twisted to the size of a twisted flag-leaf. Such paper cords may be braided by hand, but preferably by machinery, several hundred feet of braid of uniform diameter and without joint being, if desired, made at one operation, and any desired length of braid may be cut off by the workman from time to time when covering an article.

The frame of the article is covered by the paper braid in much the same way that it is covered with braided flag, with the important difference that whereas the length of the flag braid is limited and a large number of projecting ends are necessarily produced in covering a limited part of the frame the braid made from paper is of indefinite length, and a large area may be covered without the presence of projecting ends. After the frame of the chair or other article is covered in this way the fabric as a whole is treated with a hardening and coloring substance. For this purpose I preferably use melted glue, (such as Irish glue,) or shellac may be used for the same purpose. The glue may be applied by a brush, or, as I prefer, the article may be dipped bodily into a tank of melted glue, as by this last-named procedure the glue is not only made to cover without fail the entire surface of the fabric, but it also finds its way to all parts thereof and when dry cements together the several cords forming the braid and causes the different windings or rows of braid to adhere to each other and to the frame. The glue is of such consistency that it penetrates or is absorbed by the paper cords and will thus render them hard, unyielding, and most durable. The strands of the braid will not slip and the windings or rows of braid will for an indefinite time adhere to each other, thus insuring a close tight fabric throughout the entire covering. Where projecting ends occur, and these are comparatively few, they may be quite short, being, in fact, scarcely noticeable, because as there is no tendency for the strands to slip the ends may be terminated close to the surface of the fabric.

In the accompanying drawings I have illustrated a chair made in accordance with my invention; but I desire to have it understood that my invention comprehends also the manufacture of various other articles, such as settees, tables, baby-carriages, &c.

Figure 1 is a front view of a well-known form of chair, known as a "siesta-chair," with my improvements applied. Fig. 2 is an enlarged view of part of the seat portion of the chair, showing the manner in which the braids may be applied. Fig. 3 illustrates the manner of forming the paper cord from which the braid is made. Fig. 4 is a view of the braid. Fig. 5 is a detail view showing the manner in which the end of the braid is secured to the frame when the covering of the frame is first started. Fig. 6 shows, on an enlarged scale, the manner in which the ends of the braid are jointed in the body of the fabric.

To form the cord $a$, I preferably take good Manila paper $b$, from one and one-half inches to two and one-fourth inches wide, and usually splash it at various points with a light-green dye in order to give it a greenish tinge in spots resembling flag. This ribbon is twisted to form a cord or rope one-eighth of an inch thick. The width of the ribbon will depend upon the weight of the paper. A strip of sixty-pound paper one and one-half inches wide will make a suitable cord one-eighth of an inch thick; but of course the width or diameter of the cord may be varied *ad libitum*. In my application for Patent No. 131,656, filed November 17, 1902, I have shown an improved machine for making paper cord of this kind. In such a machine a smooth regular cord of indefinite length may be formed, and as I desire to form a braid of uniform size throughout its length the use of cord made by such a machine is desirable. This cord is braided in the manner illustrated in Fig. 4, three strands being preferably used. The braiding may be done in any suitable braiding-machine, although I have devised special machinery for the purpose.

Any desired length of braid $a$ may be formed at one operation without joining or splicing, and thus the braid is made of uniform strength, quality, and appearance at all points.

It is customary to first form a skeleton frame of the chair or other article by means of bent pieces of wood $d$ and reeds $e$. I do not contemplate any change in such frames, and therefore have not illustrated the details of all parts of the skeleton chair-frame indicated in the drawings. In general, however, I may say that wood is employed to form the main outlines of the frame, while reeds are used for the warps with which the braid is interwoven. Of course the reeds are only used where the surface is of large area. The legs, rounds, and some other parts of the chair are covered by merely winding the braid around them. The same is true of other articles. Some parts are covered by merely winding the braid around them, while other parts are covered by interweaving the braid with reeds or similar supports.

In Fig. 2 I have shown how the seat of the chair may be covered. It is possible by my invention to cover the entire seat with one length of braid; but as it is necessary to pull the braid back and forth between the reeds it is most convenient to limit the length. In the drawings the woven part of the seat is shown as being composed of one length of braid and part of another length, which latter may be as long as desired. The weaving is tight, the braid being pulled taut as it is passed over and under the reeds, and the successive rows or fillings are beaten up close as the weaving progresses. While being thus woven the cord is somewhat soft, so that it may be bent or compressed slightly, and thus made to produce a close fabric. It is subsequently hardened in the manner hereinafter described. After the chair (or other article) is thus covered with the paper braid it is treated with a hardening and surface-forming material, such as shellac or glue. This may be applied by a brush; but as there is a chance of the workman missing some parts I prefer to dip the article bodily into a large tank of melted glue, so that every part of the fabric may be reached. The cord being bibulous absorbs enough glue to make it hard and smooth. The strands forming the braid are permanently connected together, and the adjacent rows or fillings are also securely connected to each other and to the frame. No care has been taken to do this with the strands and braids made from flag, so far as I am aware, and as the flag-leaves by nature have a hard impervious coating they do not absorb the varnish or other covering, such covering being used merely for the purpose of providing a pleasing appearance and to form a thin waterproof surface. After the article is thus treated with glue or other hardening substance it is dried and then rendered waterproof and somewhat more attractive in appearance by one or more coatings of a finishing-varnish, which may be rubbed down or burnished, if desired.

As I have before stated, where the ends of the braids appear in the fabric they need not project therefrom, but may terminate close to the surface. The manner in which the ends of two lengths of braid may be joined in the body of the fabric is illustrated at *x* in Fig. 6, where it will be seen they lie close to the surface, where they are retained by the glue, and as after being treated by the glue the cords are hard and cemented together there is no danger of their unraveling.

I claim as my invention—

1. A chair or other article comprising a frame and a covering therefor, consisting of braided paper cord impregnated with a hardening substance, and having the strands of each braid cemented together, while the several rows of braid are in like manner adhesively connected.

2. A chair or other article, comprising a skeleton frame and a covering therefor, consisting of braided paper cord, each strand of cord being of uniform thickness, of indefinite length, and without a joint, and said braid being interwoven with the frame and impregnated with material which not only hardens and indurates the individual strands of the braid but also cements the strands of each braid together, and in like manner permanently connects the adjacent rows of braids to each other and to the frame.

3. A chair or other article, comprising a frame and a covering therefor, consisting of braided paper cord impregnated with a hardening substance, and having the strands of each braid and the several rows of braid cemented together, and coated with a finishing-varnish, substantially as described.

In testimony whereof I have hereunto subscribed my name.

HENRY B. MORRIS.

Witnesses:
ARTHUR N. GITTINGS,
HENRY W. JOHNSON.